(12) United States Patent
Russ et al.

(10) Patent No.: US 8,798,669 B2
(45) Date of Patent: Aug. 5, 2014

(54) DUAL MODULE PORTABLE DEVICES

(75) Inventors: V. Kevin Russ, Bellevue, WA (US);
John A. Snavely, Seattle, WA (US);
Edwin R. Burtner, Everett, WA (US);
Ian M. Sands, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 250 days.

(21) Appl. No.: 13/396,955

(22) Filed: Feb. 15, 2012

(65) Prior Publication Data
US 2012/0139939 A1 Jun. 7, 2012

Related U.S. Application Data

(62) Division of application No. 12/407,089, filed on Mar. 19, 2009, now Pat. No. 8,121,640.

(51) Int. Cl.
*H04M 1/00* (2006.01)
(52) U.S. Cl.
USPC .......... 455/550.1; 455/556.1; 455/41.2; 345/173
(58) Field of Classification Search
USPC .......... 455/550.1, 556.1, 41.2; 345/173
See application file for complete search history.

(56) References Cited

U.S. PATENT DOCUMENTS

| | | | |
|---|---|---|---|
| 4,495,568 A | 1/1985 | Gilbert et al. | |
| 5,115,398 A | 5/1992 | De Jong | |
| 5,602,564 A | 2/1997 | Iwamura et al. | |
| 5,790,769 A | 8/1998 | Buxton et al. | |
| 5,929,844 A | 7/1999 | Barnes | |
| 6,002,808 A | 12/1999 | Freeman | |
| 6,014,142 A | 1/2000 | LaHood | |
| 6,128,003 A | 10/2000 | Smith et al. | |
| 6,184,847 B1 | 2/2001 | Fateh et al. | |
| 6,201,554 B1 | 3/2001 | Lands | |
| 6,211,884 B1 | 4/2001 | Knittel et al. | |
| 6,285,317 B1 | 9/2001 | Ong | |
| 6,292,137 B1 | 9/2001 | Agnew et al. | |
| 6,340,957 B1 | 1/2002 | Adler et al. | |
| 6,392,661 B1 | 5/2002 | Tankersley | |
| 6,393,360 B1 | 5/2002 | Ma | |

(Continued)

FOREIGN PATENT DOCUMENTS

| | | |
|---|---|---|
| CN | 1438802 A | 8/2003 |
| JP | 11-134087 | 5/1999 |

(Continued)

OTHER PUBLICATIONS

Japanese Final Decision of Rejection dated Aug. 12, 2013 cited in Application No. 2012-500832, 5 pgs.

(Continued)

*Primary Examiner* — Danh Le
(74) *Attorney, Agent, or Firm* — Rachael Vaughn; Jim Ross; Micky Minhas

(57) ABSTRACT

A dual module portable device may be provided. A motion of a first module of the dual module portable device may be detected. Based at least in part on the detected motion, a position of the first module may be determined relative to the second module of the portable device. Once the relative position of the first module has been determined, a portion of a user interface associated with the relative position may be displayed at the first module.

16 Claims, 5 Drawing Sheets

(56) References Cited

U.S. PATENT DOCUMENTS

| | | | |
|---|---|---|---|
| 6,417,866 | B1 | 7/2002 | Man et al. |
| 6,480,148 | B1 | 11/2002 | Wilson et al. |
| 6,594,564 | B1 | 7/2003 | Vahle et al. |
| 6,823,259 | B2 | 11/2004 | Miyazawa |
| 7,231,297 | B2 | 6/2007 | Sumizawa et al. |
| 7,280,097 | B2 | 10/2007 | Chen et al. |
| 7,349,799 | B2 | 3/2008 | Joe et al. |
| 7,383,123 | B2 | 6/2008 | Park |
| 7,461,345 | B2 | 12/2008 | Lettau |
| 7,539,513 | B2 | 5/2009 | Cathey et al. |
| 7,978,176 | B2 * | 7/2011 | Forstall et al. ............... 345/158 |
| 8,121,640 | B2 | 2/2012 | Russ et al. |
| 8,219,028 | B1 * | 7/2012 | Flamholz ................... 455/41.2 |
| 8,542,186 | B2 * | 9/2013 | Alameh et al. ............... 345/156 |
| 2003/0156124 | A1 | 8/2003 | Good et al. |
| 2003/0184575 | A1 | 10/2003 | Reho et al. |
| 2004/0056907 | A1 | 3/2004 | Sharma et al. |
| 2004/0122591 | A1 | 6/2004 | MacPhail |
| 2004/0252120 | A1 | 12/2004 | Hunleth et al. |
| 2005/0030255 | A1 | 2/2005 | Chiu et al. |
| 2005/0093868 | A1 | 5/2005 | Hinckley |
| 2005/0192044 | A1 | 9/2005 | Travis |
| 2005/0256781 | A1 | 11/2005 | Sands et al. |
| 2005/0257174 | A1 | 11/2005 | Wilson |
| 2006/0019714 | A1 | 1/2006 | Lee et al. |
| 2006/0164412 | A1 | 7/2006 | Dupont et al. |
| 2006/0183505 | A1 | 8/2006 | Willrich |
| 2006/0238497 | A1 | 10/2006 | Velagapudi |
| 2007/0050129 | A1 | 3/2007 | Salmre |
| 2007/0126698 | A1 | 6/2007 | Iwamoto et al. |
| 2007/0156332 | A1 | 7/2007 | Wailes et al. |
| 2007/0204014 | A1 | 8/2007 | Greer et al. |
| 2007/0219708 | A1 | 9/2007 | Brasche et al. |
| 2007/0282564 | A1 | 12/2007 | Sprague et al. |
| 2008/0024500 | A1 | 1/2008 | Bae |
| 2008/0026772 | A1 | 1/2008 | Chang et al. |
| 2008/0036732 | A1 | 2/2008 | Wilson et al. |
| 2008/0068376 | A1 | 3/2008 | Anderson et al. |
| 2008/0090618 | A1 | 4/2008 | Lim et al. |
| 2008/0165144 | A1 * | 7/2008 | Forstall et al. ............... 345/173 |
| 2008/0167080 | A1 | 7/2008 | Su |
| 2008/0191864 | A1 | 8/2008 | Wolfson |
| 2008/0231926 | A1 | 9/2008 | Klug et al. |
| 2008/0266129 | A1 | 10/2008 | Chiang |
| 2008/0280682 | A1 | 11/2008 | Brunner et al. |
| 2008/0306685 | A1 | 12/2008 | Bernardini et al. |
| 2009/0040289 | A1 | 2/2009 | Hetherington et al. |
| 2009/0061960 | A1 | 3/2009 | Chang et al. |
| 2009/0103780 | A1 | 4/2009 | Nishihara et al. |
| 2009/0128516 | A1 | 5/2009 | Rimon et al. |
| 2009/0137293 | A1 | 5/2009 | Yoo et al. |
| 2009/0156264 | A1 | 6/2009 | Cho et al. |
| 2009/0169060 | A1 | 7/2009 | Faenger et al. |
| 2009/0228841 | A1 | 9/2009 | Hildreth |
| 2009/0233627 | A1 | 9/2009 | Chiu |
| 2009/0293012 | A1 | 11/2009 | Alter et al. |
| 2009/0300554 | A1 | 12/2009 | Kallinen |
| 2009/0310037 | A1 | 12/2009 | Jung et al. |
| 2010/0009696 | A1 | 1/2010 | Fok et al. |
| 2010/0037184 | A1 * | 2/2010 | Sie ............................... 715/863 |
| 2010/0050133 | A1 | 2/2010 | Nishihara et al. |
| 2010/0066672 | A1 * | 3/2010 | Schoolcraft et al. ......... 345/158 |
| 2010/0066676 | A1 | 3/2010 | Kramer et al. |
| 2010/0082983 | A1 * | 4/2010 | Shah et al. ................... 713/169 |
| 2010/0161658 | A1 | 6/2010 | Hamynen et al. |
| 2010/0167711 | A1 * | 7/2010 | Alameh et al. ............... 455/416 |
| 2010/0210216 | A1 * | 8/2010 | Westlund ..................... 455/66.1 |
| 2010/0240390 | A1 | 9/2010 | Russ et al. |
| 2010/0241348 | A1 | 9/2010 | Russ et al. |
| 2010/0241987 | A1 | 9/2010 | Russ et al. |
| 2010/0241999 | A1 | 9/2010 | Russ et al. |
| 2011/0022393 | A1 | 1/2011 | Waller et al. |
| 2011/0103651 | A1 | 5/2011 | Nowak et al. |

FOREIGN PATENT DOCUMENTS

| | | |
|---|---|---|
| JP | 2000-293120 | 10/2000 |
| JP | 2003-195843 | 7/2003 |
| JP | 2004-191642 | 7/2004 |
| JP | 2006-243200 | 9/2006 |
| JP | 2008-263622 | 10/2008 |
| WO | 2007-135776 A1 | 11/2007 |

OTHER PUBLICATIONS

Japanese Notice of Rejection dated Apr. 9, 2013 cited in Application No. 2012-500832, 12 pgs.

U.S. Office Action dated Oct. 3, 2013 cited in U.S. Appl. No. 12/407,128, 40 pgs.

Mara Mihale, "NTT Docomo Separate Keitai Splits in Two," Oct. 3, 2008, 4 pgs., http://www.cameraphonesplaza.com/ntt-docomo-separate-keitai-splits-in-two/.

Joshua Fruhlinger, "Dual-Display e-Book Concept Mimicks Reading, Makes Complete Sense," Jun. 26, 2008, 10 pgs., http://www.engadget.om/2008/06/26/dual-display-e-book-concept-mimicks-reading-makes-complete-sens/.

Gerrit Niezen et al., "Gesture Recognition as Ubiquitous Input for Mobile Phones," UbiComp '08 Workshop I1—Devices that Alter Perception (DAP 2008), Sep. 21, 2008, 5 pgs., http://www.k2.t.u-tokyo.ac.jp/perception/dap2008/papers/Niezen_dap2008.pdf.

Thomas Fuhrmann et al., "The BlueWand as Interface for Ubiquitous and Wearable Computing Environments," Printed on Jan. 21, 2009, 5 pgs., http://i30www.ira.uka.de/research/documents/p2p/2003/fuhrmann03bluewand-EPMCC.pdf.

L. Chittaro, "Visualizing Information on Mobile Devices," Mar. 2006, 8 pgs., http://www.computer.org/portal/site/computer/menuitem.5d61c1d591162e4b0ef1bd108bcd45f3/index.jsp?&pName=computer_levell_article&TheCat=1005&path=computer/homepage/0306&file=cover.xml&xsl=article.xsl&;jsessionid=J6qNnKh50TfhhYWy8rTpByz4Ks0jKkHXvwpgTQJfKk3Tmj9wTp64!-1582182879.

Stefano Burigat et al., "Map, Diagram, and Web Page Navigation on Mobile Devices: the Effectiveness of Zoomable User Interfaces with Overviews," Sep. 2-5, 2008, 10 pgs., http://hcilab.uniud.it/publications/2008-09/ZoomableUserInterfaceswithOverviews_MOBHCI2008.pdf.

Yi Wang et al., "2D/3D Web Visualization on Mobile Devices," Printed on Jan. 23, 2009, 12 pgs., yi.wang.2005.googlepages.com/2D-3DWebVisualizationonMobileDevices.pdf.

Patrick Baudisch et al., "Halo: a Technique for Visualizing Off-Screen Locations," 8 pgs., CHI 2003, Apr. 5-10, 2003, Ft. Lauderdale, FL, http://www.darmstadt.gmd.de/~baudisch/Publications/2003-Baudisch-CHI03-Halo.pdf.

Sean Gustafson et al., "Wedge: Clutter-Free Visualization of Off-Screen Locations," pp. 1-10, CHI 2008, Apr. 5-10, 2008, Florence, Italy, http://www.patrickbaudisch.com/publications/2008-Gustafson-CHI08-WedgeClutterFreeVisualizationOfOffScreenLocations.pdf.

Stefano Burigat et al., "Visualizing Locations of Off-Screen Objects on Mobile Devices: A comparative Evaluation of Three Approaches," pp. 239-246, MobileHCI '06, Sep. 12-15, 2006, Helsinki, Finland, http://portal.acm.org/citation.cfm?id=1152266.

Thomas H. Kolbe, Bonn, "Augmented Videos and Panoramas for Pedestrian Navigation," Proceedings of the 2$^{nd}$ Symposium on Location Based Services & TeleCartography, Jan. 28-29, 2004, pp. 1-10, http://www.ikg.unibonn.de/uploads/tx_ikgpublication/TeleCartography2004_Kolbe.pdf.

"Signpost 2—Mobile AR Navigation System," Printed on Jan. 15, 2009, 13 pgs., http://studierstube.icg.tu-graz.ac.at/projects/mobile/SignPost2/.

Tetsuya Manabe et al., "On the M-CubITS Pedestrian Navigation System," Proceedings of the IEEE ITSC 2006, 2006 IEEE Intelligent Transportation Systems Conference, Toronto, Canada, Sep. 17-20, 2006, pp. 793-798, http://ieeexplore.ieee.org/stamp/stamp.jsp?arnumber=01706840.

(56) References Cited

OTHER PUBLICATIONS

Allen Ka Lun Miu, "Design and Implementation of an Indoor Mobile Navigation System," Massachusetts Institute of Technology, Jan. 2002, pp. 1-60, http://nms.lcs.mit.edu/publications/cricketnav-thesis.pdf.

Masaki Omata et al., "A Gesture-based Interface for Seamless Communication between Real and Virtual Worlds," 6th ERCIM Workshop "User Interfaces for All", CNR-IROE, Florence, Italy, Oct. 25-26, 2000, 13 pgs., http://www.ui4all.gr/UI4ALL-2000/files/Long_papers/Omata.pdf.

Jonathan Mooser et al., "Large Document, Small Screen: A Camera Driven Scroll and Zoom Control for Mobile Devices," CGIT Lab, University of Southern California, Feb. 15-17, 2008, pp. 27-34, http://graphics.usc.edu/~mooser/JM_I3D08.pdf.

Rajeev Sharma et al., "Speech/Gesture Interface to a Visual-Computing Environment," IEEE Computer Graphics and Applications, Mar./Apr. 2000, pp. 29-37, http://www.ks.uiuc.edu/Publications/Papers/PDF/SHAR2000/SHAR2000.pdf.

Marcio C. Cabral et al., "On the Usability of Gesture Interfaces in Virtual Reality Environments," Printed on Jan. 16, 2009, 9 pgs., http://www.lsi.usp.br/~mcabral/mcabralclihc2005.pdf.

Tovi Grossman et al., "Multi-Finger Gestural Interaction with 3D Volumetric Displays," UIST, Oct. 24-27, 2004, Santa Fe, New Mexico, 10 pgs., http://www.dgp.toronto.edu/papers/tgrossman_UIST2004.pdf.

International Search Report dated Oct. 20, 2010 cited in Application No. PCT/US2010/026717.

U.S. Office Action dated May 25, 2011 cited in U.S. Appl. No. 12/407,009.

Rich Gibson et al., "Google Maps Hacks," O'Reilly, pp. iii, 14, 19, 226, & 227, Jan. 2006.

Polle T. Zellweger et al., "City Lights: Contextual Views in Minimal Space," 2003 Conference on Human Factors in Computing Systems, pp. 838-839, Apr. 2003.

Sean Gustafson, "Visualizing Off-Screen Locations on Small Mobile Displays," Department of Computer Science, University of Manitoba, pp. i, 33-36, & 49, Dec. 2008.

U.S. Office Action dated Jun. 7, 2011 cited in U.S. Appl. No. 12/407,128.

U.S. Office Action dated Jul. 26, 2011 cited in U.S. Appl. No. 12/407,058.

U.S. Final Office Action dated Oct. 26, 2011 cited in U.S. Appl. No. 12/407,009, 15 pgs.

U.S. Final Office Action dated Oct. 26, 2011 cited in U.S. Appl. No. 12/407,128, 16 pgs.

U.S. Final Office Action dated Dec. 21, 2011 cited in U.S. Appl. No. 12/407,058, 16 pgs.

U.S. Final Office Action dated Mar. 27, 2013 cited in U.S. Appl. No. 12/407,128, 32 pgs.

U.S. Office Action dated Sep. 12, 2012 cited in U.S. Appl. No. 12/407,009, 30 pgs.

Gibson et al., "Google Maps Hacks," O'Reilly Media, Jan. 2006, pp. iii, 14, 15, 19, 117-121, 226, & 227.

U.S. Office Action dated Sep. 12, 2012 cited in U.S. Appl. No. 12/407,128, 34 pgs.

European Communication Extended Search Report dated Feb. 21, 2014 in Application No. 10 75 3890.2, 7 pgs.

Chinese Second Office Action dated Apr. 16, 2014 in Application No. 201080012903.1, 12 pgs.

U.S. Final Office Action dated May 21, 2014 in U.S. Appl. No. 12/407,128, 20 pgs.

* cited by examiner

DUAL MODULE PORTABLE DEVICES

RELATED APPLICATIONS

This application is a Divisional of co-pending U.S. application Ser. No. 12/407,089 entitled "Dual Module Portable Devices" filed Mar. 19, 2009, which is incorporated herein by reference.

Related U.S. application Ser. No. 12/407,009, entitled "Tear-Drop Object Indication", related U.S. application Ser. No. 12/407,058, entitled "Projected Way-Finding", and related U.S. application Ser. No. 12/407,128, entitled "Gesture Operated User Interfaces", filed on even date herewith, assigned to the assignee of the present application, are hereby incorporated by reference.

BACKGROUND

Multi-Touch is becoming a standard way to interact with mobile devices. However, there are still many interaction types that are difficult to perform on a mobile device. This is largely due to limited screen real estate and small device form. Drag-and-drop, for instance, is difficult or impossible on most mobile devices. It is also difficult for more than one person to simultaneously view information on a mobile device.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A dual module portable device may be provided. A motion of a first module of the dual module portable device may be detected. Based at least in part on the detected motion, a position of the first module may be determined relative to the second module of the portable device. Once the relative position of the first module has been determined, a portion of a user interface associated with the relative position may be displayed at the first module.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
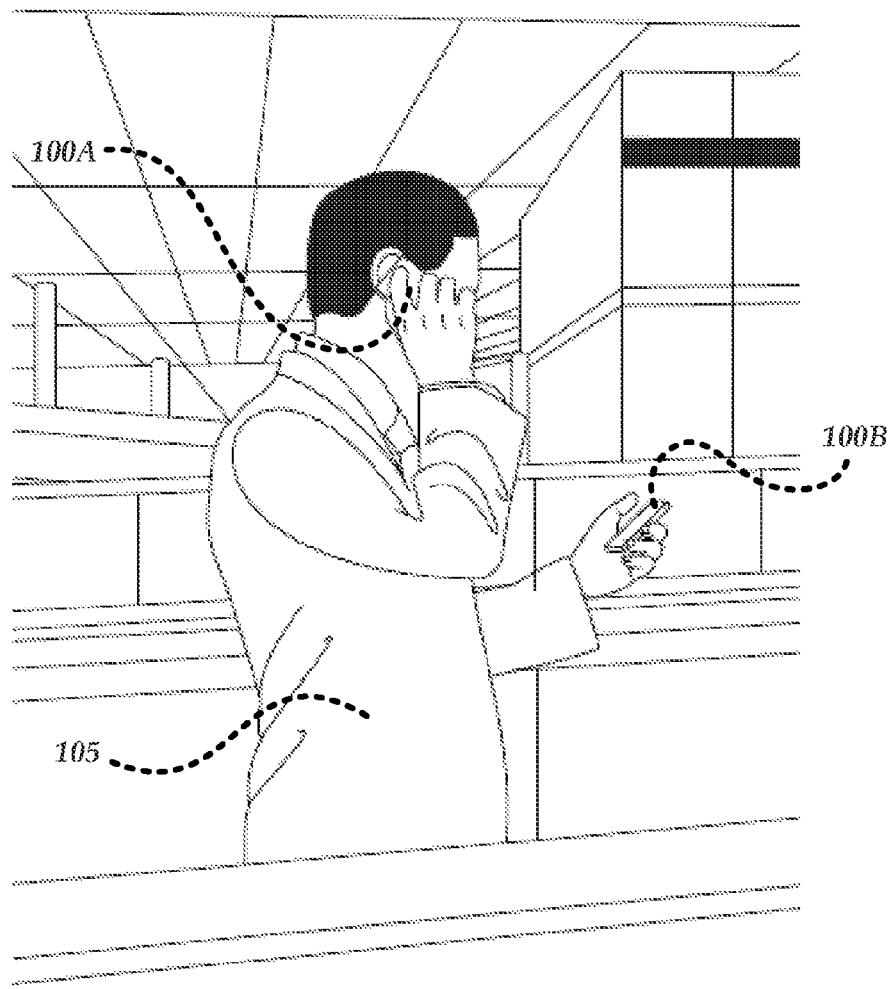
FIG. 1 is a diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

FIG. 1 is a diagram of an operating environment. As shown in FIG. 1, a dual module portable device 100 may be comprised of a first module 100A and a second module 100B. First module 100A or second module 100B may include a computing device 500 as described in more detail below with respect to FIG. 5. Either first module 100A or second module 100B may be operable in accordance with, but is not limited to, various embodiments associated with a portable device 100 as described at least with respect to FIG. 1 in U.S. application Ser. No. 12/407,058 ('Projected Way-Finding,'). In addition, either first module 100A or second module 100B may provide various embodiments of a user interface 100 as described at least with respect to FIG. 1 in U.S. application Ser. No. 12/407,009 ('Tear-Drop Way-Finding,').

Furthermore, dual module portable device 100 may comprise, but is not limited to, a communications device, a mobile communications device, a mobile device comprising a camera and speakers, a personal digital assistant, a telephone, a cellular telephone, a smart phone, a computer, or a handheld computer. Moreover, either first module 100A or second module 100B may be capable of providing at least a portion of voice and data services. In this way, as illustrated in FIG. 1, a user 105 may be provided with voice services at first module 100A while interacting with data services provided to second module 100B. Similarly, a first application may be executed on first module 100A while a second application in communication with the first application may be executed simultaneously on second module 100B. Consistent with embodiments of the invention, dual module portable device 100 may comprise, include, or otherwise utilize computing device 500 as described in more detail below with respect to FIG. 5.

Figure 2:
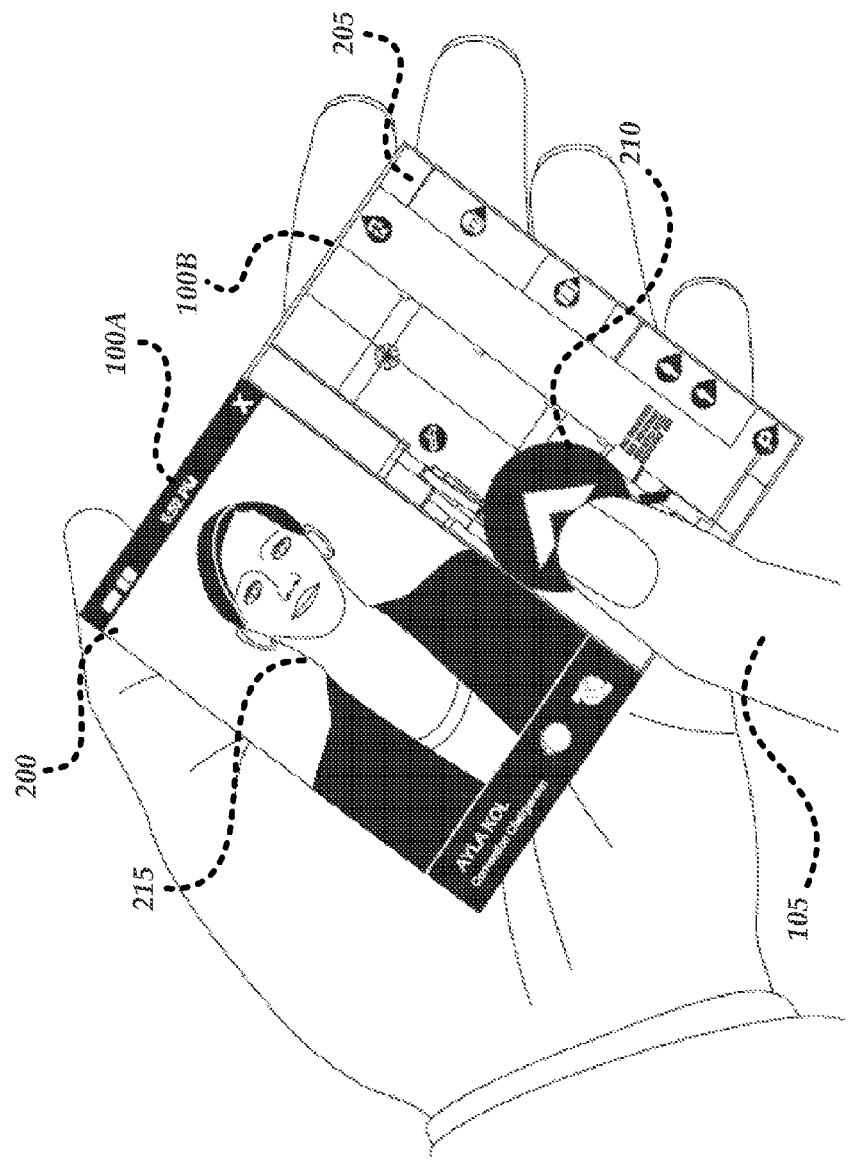
FIG. 2 is another diagram of an operating environment.

FIG. 2 is another diagram of an operating environment. As shown in FIG. 2, first module 100A and second module 100B may be magnetically connected with each other in various ways. For example, first module 100A and second module 100B may comprise magnetic strips at each edge, enabling user 105 to connect the modules edge-to-edge. In this way, when first module 100A and second module 100B may be connected edge-to-edge, user 105 may drag-and-drop objects displayed at a first multi-touch full-screen display 200 of first module 100A to second multi-touch full screen display 205 of second module 100B. In other embodiments, first module 100A and second module 100B may be magnetically connected back-to-back (not shown). Accordingly, second display 205 may display an object 210 while first display 200 may display contextual information 215 associated with displayed object 210.

Furthermore, consistent with embodiments of the invention, first module 100A and second module 100B may each comprise position, motion, and orientation detection devices as described in U.S. application Ser. No. 12/407,058 ('Projected Way-Finding,'). For example, first module 100A may comprise at least one accelerometer for detecting a movement of first module 100A. In turn, detected motions of first module 100A may be communicated to second module 100B. Similarly, second module 100B may also communicate its corresponding accelerometer readings to first module 100A. In this way, first module 100A may be aware of second module 100B's relative motions, and vice-versa.

In embodiments of the invention, first module 100A may be operative to execute an action associated with its relative motions to second module 100B. For example, moving first module 100A forward relative to second module 100B may cause first display 200 to zoom out of a displayed first user interface portion, while second display 205 may zoom in on a displayed second user interface portion. Accordingly, various detected gestures may cause various user interface manipulations in accordance with U.S. application Ser. No. 12/407,128 ('Gesture Operated User Interfaces,').

Figure 3:
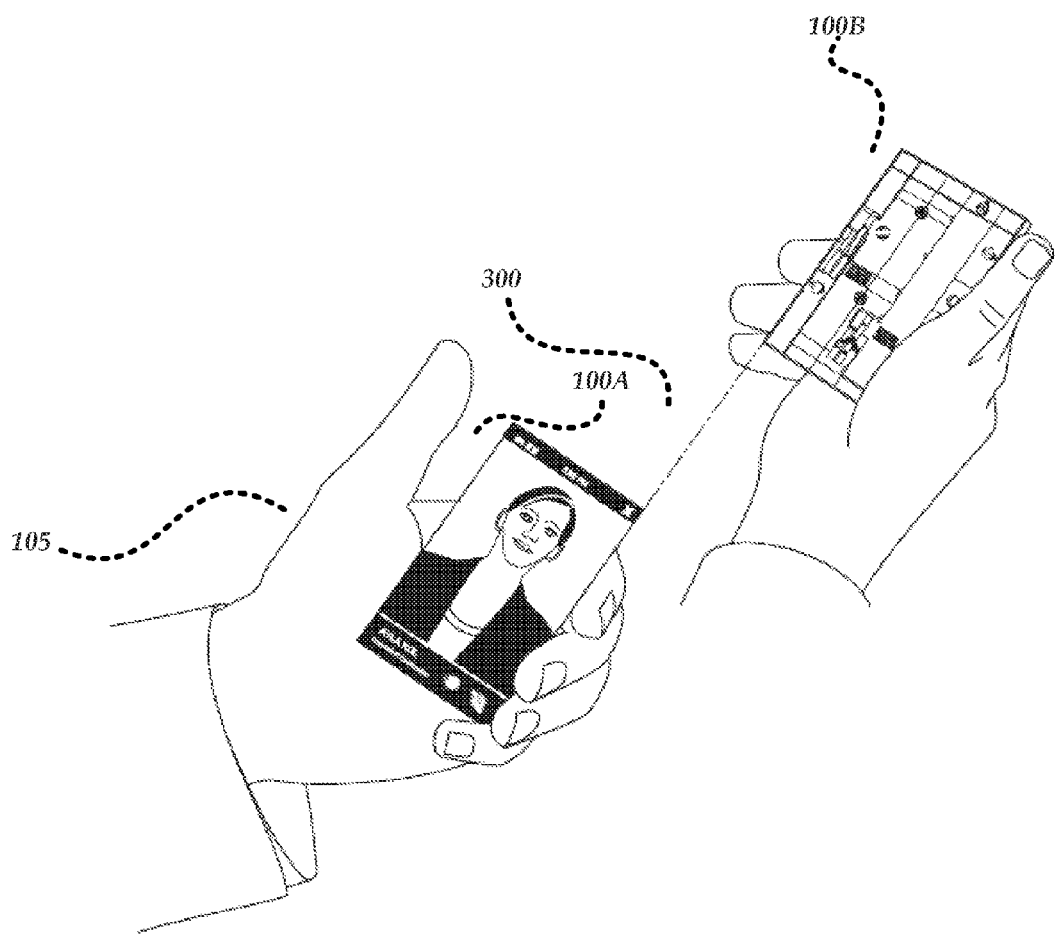
FIG. 3 is yet another diagram of an operating environment.

FIG. 3 is yet another diagram of an operating environment. Consistent with embodiments of the invention, first module 100A may be operative to calculate its proximity 300 to second module 100B. For example, first module 100A and second module 200B may initially be connected (as shown in FIG. 2) in order to set a distance calibration point. Illustrated in FIG. 3, as user 105 separates first module 100A from second module 100B, the modules may inter-communicate each other's motion detections. Based on these communicated motion detections, and taking into account the initial calibration point, the modules may be able to calculate proximity 300. In this way, when each module has detected and communicated a displacement of, for example, six inches in exact opposite directions from the initial calibration point, proximity 300 may be calculated to a value of 12 inches. In other embodiments, proximity 300 may be determined by inter-communicating module positions rather than motions.

In accordance with embodiments of the invention, first module 100A and second module 100B may each display portions of a user interface. The user interface may correspond to dual module portable device 100's location, as, for example, a user interface 100 detailed in U.S. application Ser. No. 12/407,009 ('Tear-Drop Way-Finding,'). For instance, first module 100A may display a first portion of a map, while second module 100B may display a second portion of the map. In this way, as user 105 repositions, for example, first module 100A relative to second module 100B, a different portion of the map may be displayed at first module 100A, as though user 105 was viewing a stationary map. Similarly, as user 105 repositions second module 100B, a different portion of the map may be displayed at second module 100B. In order to detect user 105's relative repositioning of the modules, information inter-communication, as described above with reference to FIG. 1 and FIG. 2, may be employed. Moreover, and as mentioned above, gesture detections of the modules may manipulate the display of the map in accordance with user interface manipulations disclosed in U.S. application Ser. No. 12/407,128 ('Gesture Operated User Interfaces,').

Figure 4:
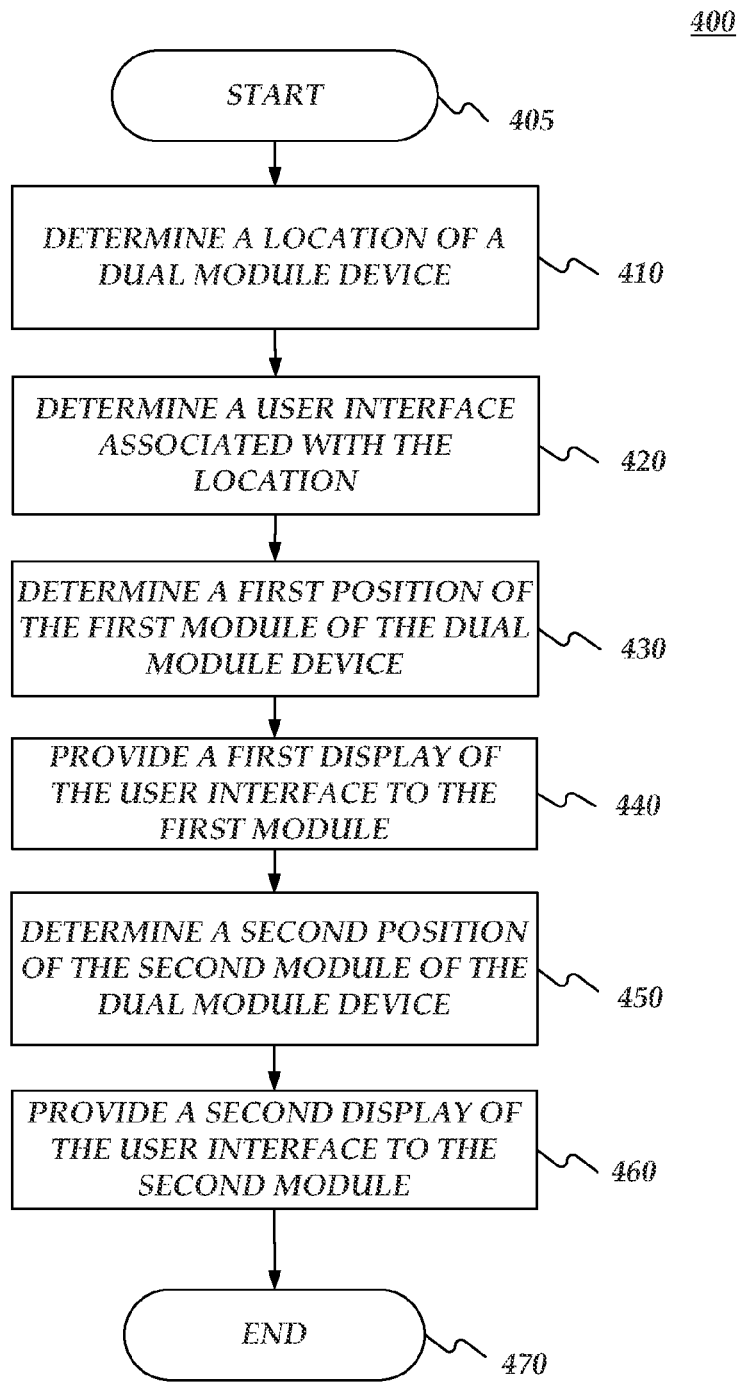
FIG. 4 is a flow chart of a method for operating a dual module portable device.

FIG. 4 is a flow chart setting forth the general stages involved in a method 400 consistent with an embodiment of the invention for operating a dual module portable device. Method 400 may be implemented using a computing device 500 as described in more detail below with respect to FIG. 5. Ways to implement the stages of method 400 will be described in greater detail below.

Method 400 may begin at starting block 405 and proceed to stage 410 where dual module portable device 100 may determine a current location. For example, at least one module of dual module portable device 100 may comprise as position detection device as disclosed in U.S. application Ser. No. 12/407,058 ('Projected Way-Finding,'). The position detection device may be in communication with a global or local positioning system and may use triangulation to detect the current location. In this way, dual module portable device 100 may determine its current location by reading coordinate information that may be provided from the position detection device.

From stage 410, where device 100 detects its current location, method 400 may advance to stage 420 where device 100 may determine a user interface associated with the location. For example, a map corresponding to the current location may be provided. The map may be display objects, tear-drop icons, and any user interface features or operations disclosed in U.S. application Ser. No. 12/407,009 ('Tear-Drop Way-Finding,').

Once device 100 determines the associated user interface in stage 420, method 400 may continue to stage 430 where device 100 may determine a first position of first module 100A of the dual module portable device 100. For example, first module 100A may comprise at least one accelerometer in accordance with the motion detection module disclosed in U.S. application Ser. No. 12/407,058 ('Projected Way-Finding,'), used to detect module 100A's motion. Moreover, first module 100A may wirelessly receive accelerometer readings from second module 100B. In this way, based at least in part on first module 100A's accelerometer readings and second module 100B's accelerometer readings, dual module portable device 100 may determine first module 100A's relative position to second module 100B.

After device 100 determines the first position of first module 100A in stage 430, method 400 may proceed to stage 440 where device 100 may provide a first display to first module 100A. For example, based at least in part on the determined first module 100A's relative position, a corresponding first user interface portion may be provided for display at first display 200 of first module 100A. In various other embodiments of the invention, the corresponding first user interface portion may be provided to first module 100A based at least in part on a calculated proximity to second module 100B, a detected position, a detected gesture, or user interface event of either first module 100A or second module 100B. The first user interface portion may comprise, for example, a first portion of a map associated with dual module portable device 100's location. As user 105 repositions first module 100A away from the first position, a corresponding different portion of the map may be displayed to first module 100A.

From stage 440, where portable device 100 provides the first display to first module 100A, method 400 may advance to stage 450 where device 100 may determine a second position of second module 100B of the dual module portable device 100. For example, second module 100B may comprise at least one accelerometer in accordance with the motion detection module disclosed in U.S. application Ser. No. 12/407,058 ('Projected Way-Finding,'), used to detect module 100A's motion. Moreover, second module 100B may wirelessly receive accelerometer readings from second module 100B. In this way, based at least in part on second module 100B's accelerometer readings and first module 100A's accelerometer readings, dual module portable device 100 may determine second module 100B's relative position to first module 100A.

Once device 100 determines the second position of second module 100B in stage 450, method 400 may continue to stage 460 where device 100 may provide a second display to second module 100B. Once device 100 determines the second position of second module 100B in stage 450, method 400 may continue to stage 460 where device 100 may provide a second display to second module 100B. For example, based at least in part on the determined second module 100B's relative position, a corresponding second user interface portion may be provided for display at second display 200 of second module 100B. In other embodiments of the invention, the corresponding second user interface portion may be provided to second module 100B based at least in part on a calculated proximity to first module 100A, a detected position, a detected gesture, or user interface event of either first module 100A or second module 100B. The second user interface portion may comprise, for example, a second portion of a map associated with dual module portable device 100's location. As user 105 repositions second module 100B away from the first position, a corresponding different portion of the map may be displayed to second module 100B. After device 100 has provided the second display to second module 100B in stage 460, method 400 may then end at stage 470.

Embodiments consistent with the invention may comprise a system for providing a dual module portable device. The system may comprise a memory storage and a processing unit coupled to the memory storage. The processing unit may be operative to detect a motion of each module of the dual module portable device. Then, based at least in part on the detected motion, the processing unit may proceed to determine a position of each module relative to one another and execute an operation associated with their relative positions. The operation may be executed by the processing unit on either module of the dual module portable device.

Another embodiment consistent with the invention may comprise a system for providing a mobile communications device having two independent modules. The system may comprise a memory storage and a processing unit coupled to the memory storage on each of the two independent modules. Each processing unit may be operative to wireless inter-communicate accelerometer reading associated with their corresponding module. Based on the inter-communicated readings, the processing units may determine proximity between the two modules. Each processing unit may then determine a portion of a user interface to display at their corresponding module based at least in part on the proximity between the two modules.

Yet another embodiment consistent with the invention may comprise a system for operating a dual module device. The system may comprise a memory storage and a processing unit coupled to the memory storage. The processing unit may be operative to determine a location of the dual module device and display a user interface associated with the location. The processing unit may be further operative to determine each modules position relative to one another and provide corresponding portions of the user interface to each of the modules based on their relative position to one another.

Figure 5:
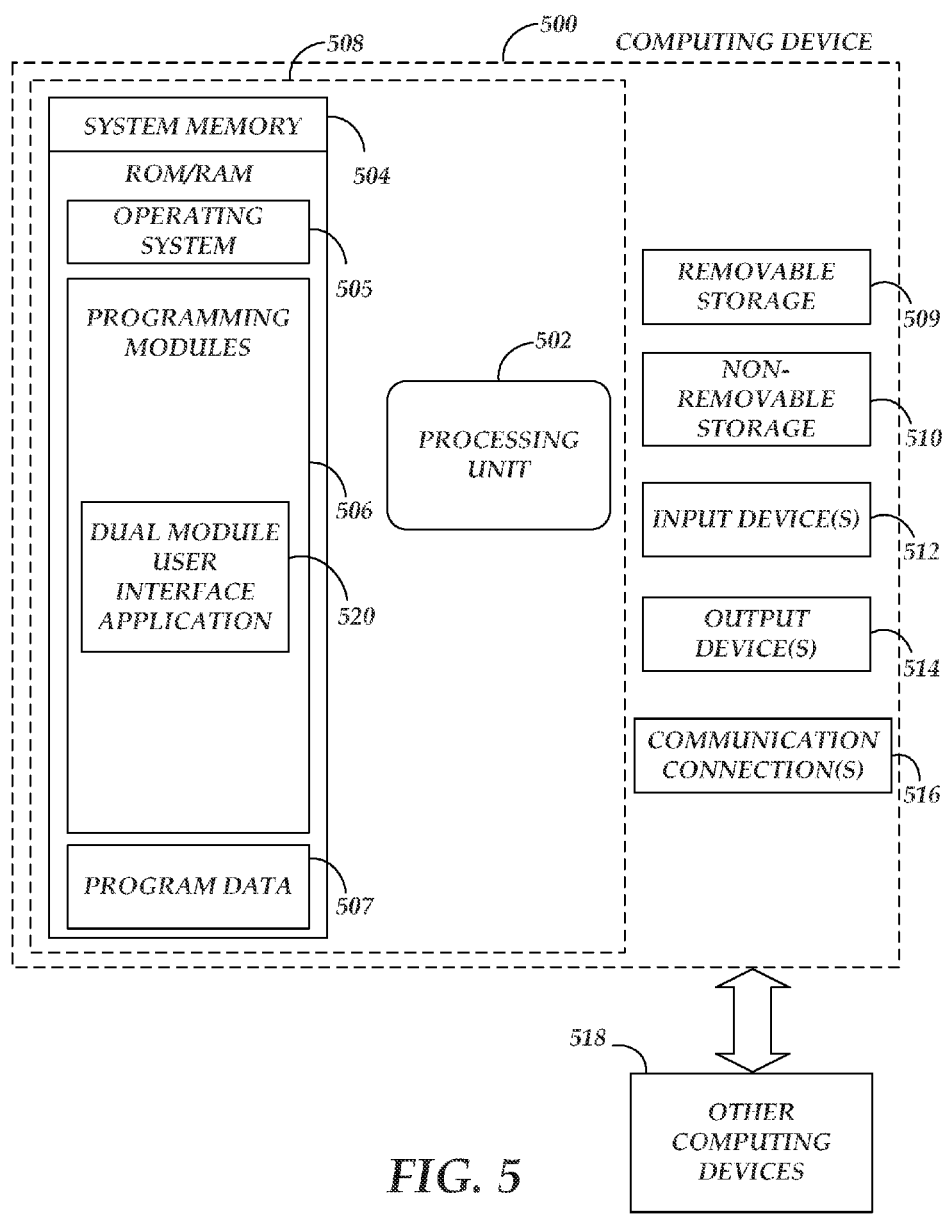
FIG. 5 is a block diagram of a system including a computing device.

FIG. 5 is a block diagram of a system including computing device 500. Consistent with an embodiment of the invention, the aforementioned memory storage and processing unit may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the invention. Furthermore, computing device 500 may comprise an operating environment for system 100 as described above. System 100 may operate in other environments and is not limited to computing device 500.

With reference to FIG. 5, a system consistent with an embodiment of the invention may include a computing device, such as computing device 500, for each module of the dual module portable device 100. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a program data 507. Operating system 505, for example, may be suitable for controlling computing device 500's operation. In one embodiment, programming modules 506 may include a dual module user interface application 520. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g. dual module user interface application 520) may perform processes including, for example, one or more method 400's stages as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A mobile communications device comprising:
  a first separated module having a first display, the first separated module being operative to:
    receive a first accelerometer reading from a second separated module,
    determine a proximity to the second separated module based at least in part on the second accelerometer reading,
    determine a first portion of a user interface based at least in part on the first proximity, and
    display the first portion of the user interface to the first display;
  the second separated module having a second display, the second separated module being operative to:
    receive a second accelerometer reading from the first separated module,
    determine the proximity to the first separated module based at least in part on the second accelerometer reading, determine a second portion of the user interface based at least in part on the second proximity, and display the second portion of the user interface to the second display.

2. The mobile communications device of claim 1, wherein the first separated module is configured to combine with the second separated module to form a combined module.

3. The mobile communications device of claim 2, wherein the combined module forms a continuous display comprised of the first display and the second display, the continuous display being operative to allow a drag-and-drop objects from the first display to the second display.

4. The mobile communications device of claim 2, wherein the first separated module and the second separated module are designed to be physically combined with each other in order to form the combined module via magnetic attraction.

5. The mobile communications device of claim 2, wherein the combined module comprises the first display on a front side of the combined module and the second display on a backside of the combined module.

6. The mobile communications device of claim 1, wherein the first separated module is further operative to:

determine a first operation based on the first accelerometer reading, and execute the first operation on at least one of: the first separated module and the second separated module, and wherein the second separated module is further operative to:

determine a second operation based on the second accelerometer reading, and execute the second operation on at least one of: the first separated module and the second separated module.

7. The mobile communications device of claim 6, wherein the first operation and the second operation are further operative to manipulate a representation of at least one of: the first portion of the user interface and the second portion of the user interface.

8. The mobile communications device of claim 7, wherein the first operation and the second operation are further operative to manipulate a representation of at least one of: the first portion of the user interface and the second portion of the user interface by at least one of the following:

zooming into at least one of: the first portion the user interface and the second portion of the user interface, zooming out of at least one of: the first portion the user interface and the second portion of the user interface, and rotating at least one of: the first portion the user interface and the second portion of the user interface.

9. The mobile communications device of claim 1, wherein the first separated module is further operative to display at least one data object.

10. The mobile communications device of claim 1, wherein the second separated module is operative to display contextual information associated with the at least one data object.

11. The mobile communications device of claim 1, wherein the first separated module is further operative to provide at least a first portion of voice and data services operative to communicate a video stream, and wherein the second separated module is further operative to provide at least a second portion of the voice and data services operative to communicate an audio stream.

12. A mobile communications device having two independent modules, the mobile device comprising:

a first separated module having a first multi-touch display, the first separated module being operative to:

communicate a first accelerometer reading to a second separated module, receive a second accelerometer reading from the second separated module, determine a proximity to the second separated module based at least in part on the first accelerometer reading and the second accelerometer reading, determine a first portion of a user interface based at least in part on the first proximity, display the first portion of the user interface to the first multi-touch display, and combine with the second separated module to form a combined module; and the second separated module having a second multi-touch display, the second separated module being operative to:

communicate the second accelerometer reading to the first separated module, receive the first accelerometer reading from the first separated module, determine the proximity to the first separated module based at least in part on the first accelerometer reading and the second accelerometer reading, determine a second portion of the user interface based at least in part on the second proximity, display the second portion of the user interface to the second multi-touch display, and combine with the second separated module to form a combined module.

13. The mobile communications device of claim 12, wherein the first separated module is further operative to:

determine a first operation based on the first accelerometer reading, and execute the first operation on at least one of: the first separated module and the second separated module, and wherein the second separated module is further operative to:

determine a second operation based on the second accelerometer reading, and execute the second operation on at least one of: the first separated module and the second separated module.

14. The mobile communications device of claim 12, wherein the first operation and the second operation are further operative to manipulate a representation of at least one of:

the first portion of the user interface and the second portion of the user interface by at least one of the following:

zooming into at least one of: the first portion the user interface and the second portion of the user interface, zooming out of at least one of: the first portion the user interface and the second portion of the user interface, and rotating at least one of: the first portion the user interface and the second portion of the user interface.

15. The mobile communications device of claim 12, wherein the first separated module is further operative to display at least one data object, and wherein the second separated module is operative to display contextual information associated with the at least one data object.

16. The mobile communications device of claim 12, wherein the combined module forms a continuous display comprised of the first multi-touch display and the second multi-touch display, the continuous display being operative to allow a drag-and-drop objects from the first multi-touch display to the second multi-touch display.

* * * * *